(12) United States Patent
Kozik

(10) Patent No.: US 6,557,579 B2
(45) Date of Patent: May 6, 2003

(54) DOUBLE METAL SEAL

(75) Inventor: Meir Kozik, Moshav Bnei Zion (IL)

(73) Assignee: K.C.Technologies Ltd., Tel Aviv (IL)

( * ) Notice: Subject to any disclaimer, the term of this patent is extended or adjusted under 35 U.S.C. 154(b) by 0 days.

(21) Appl. No.: 09/952,128

(22) Filed: Sep. 13, 2001

(65) Prior Publication Data

US 2002/0043284 A1 Apr. 18, 2002

Related U.S. Application Data

(63) Continuation-in-part of application No. 09/733,504, filed on Dec. 8, 2000, now Pat. No. 6,308,729, which is a continuation-in-part of application No. 09/490,136, filed on Jan. 24, 2000, now Pat. No. 6,227,233, which is a continuation of application No. 09/148,578, filed on Sep. 4, 1998, now Pat. No. 6,026,841.

(30) Foreign Application Priority Data

Sep. 8, 1997 (IL) .................................................. 121723
Jul. 23, 1998 (IL) .................................................. 125499

(51) Int. Cl.$^7$ .......................... F16K 31/26; F16K 31/52; B08B 9/032
(52) U.S. Cl. ....................... 137/238; 137/422; 137/442; 137/446; 141/89; 141/198
(58) Field of Search .............................. 137/444, 446, 137/451, 238, 242, 244; 141/59, 198, 89

(56) References Cited

U.S. PATENT DOCUMENTS

| | | |
|---|---|---|
| 453,069 A | 5/1891 | Vosburgh |
| 459,044 A | 9/1891 | Moore |
| 582,911 A | 5/1897 | Frederick |
| 674,276 A | 5/1901 | Moore |
| 767,848 A | 8/1904 | Stillman |
| 1,137,214 A | 4/1915 | Kelley |
| 1,266,637 A | 5/1918 | Synder |
| 1,983,061 A | 12/1934 | Ambroz et al. |
| 2,341,018 A | * 2/1944 | Clapp .......................... 137/244 |
| 2,504,638 A | 4/1950 | Browning |

(List continued on next page.)

FOREIGN PATENT DOCUMENTS

| | | |
|---|---|---|
| AU | 11 554 | 2/1928 |
| DE | 11 42 736 | 12/1963 |
| DK | 112 626 | 12/1944 |
| GB | 613 813 | 12/1948 |
| GB | 2 062 811 | 5/1981 |
| IL | 117543 | 3/1996 |
| IT | 605 477 | 3/1959 |

Primary Examiner—George L. Walton
(74) Attorney, Agent, or Firm—Abelman, Frayne & Schwab

(57) ABSTRACT

A filling valve for a pressurized fluid container, including a valve body with a longitudinal bore and a side opening formed therein, a sealing assembly slidingly disposed in the valve body, the sealing assembly being formed with a bore therethrough, a valve lever pivotally attached to a portion of the valve body, the sealing, assembly including a jutting portion which protrudes in a direction generally away from a bottom portion of the valve body, a float arm attached to the valve lever, and a float mounted on the float arm, wherein when the float is positioned at a generally obtuse angle with respect to a longitudinal axis of the valve body, the jutting portion of the sealing assembly is raised and supported by the valve lever, such that the sealing assembly is raised and does not block the side opening thereby permitting fluid flow through the side opening, and wherein when the float is sufficiently buoyed by a fluid, the float arm swings upwards and the jutting portion of the sealing assembly is no longer supported by the valve lever and the sealing assembly moves downwards and blocks the side opening, thereby preventing fluid flow through the side opening.

9 Claims, 7 Drawing Sheets

U.S. PATENT DOCUMENTS

| | | |
|---|---|---|
| 2,550,313 A | 4/1951 | Tucker |
| 3,324,878 A | 6/1967 | Dill |
| 3,716,069 A * | 2/1973 | Reynolds .................... 137/244 |
| 3,756,269 A | 9/1973 | Brown |
| 4,050,473 A * | 9/1977 | Cho ........................... 137/244 |
| 4,064,907 A | 12/1977 | Billington et al. |
| 4,142,552 A | 3/1979 | Brown, et al. |
| 4,177,829 A | 12/1979 | Friedman |
| 4,294,288 A | 10/1981 | Murthy |
| 4,416,302 A | 11/1983 | Schoepe |
| 4,483,367 A | 11/1984 | Ross, Jr. et al. |
| 4,541,464 A | 9/1985 | Christiansen |
| 4,777,975 A * | 10/1988 | Strangefeld ................. 137/242 |
| 5,005,613 A | 4/1991 | Stanley |
| 5,007,450 A | 4/1991 | Babb et al. |
| 5,072,751 A | 12/1991 | Lin |
| 5,207,241 A | 5/1993 | Babb |
| 5,234,019 A | 8/1993 | Forner |
| 5,282,496 A | 2/1994 | Kerger |
| 5,485,865 A | 1/1996 | Shirk |
| 5,487,404 A | 1/1996 | Kerger |
| 5,522,415 A | 6/1996 | Hopenfeld |
| 5,531,247 A | 7/1996 | Borst et al. |
| 6,026,841 A | 2/2000 | Kozik |
| 6,308,729 B2 | 10/2001 | Kozik |

* cited by examiner

DOUBLE METAL SEAL

REFERENCE TO RELATED APPLICATION

This application is a continuation-in-part of assignee's allowed application U.S. Ser. No. 09/733,504, filed on Dec. 8, 2000, and entitled "Filling Valve For A Pressurized Fluid Container" now U.S. Pat. No. 6,308,729 which is a continuation-in-part of patent application Ser. No. 09/490, 136 filed Jan. 24, 2000 now U.S. Pat. No. 6,227,233, which is a continuation of U.S. patent application Ser. No. 09/148, 578 filed Sep. 4, 1998, now U.S. Pat. No. 6,026,841.

FIELD OF THE INVENTION

The present invention relates to fluid filling valves generally.

BACKGROUND OF THE INVENTION

The following U.S. Patents are believed to be relevant to the subject matter of the present invention:
U.S. Pat. Nos. 582,911; 1,266,637; 1,983,0612; 2,504,638; 2,550,313; 3,324,878; 3,756,269; 4,064,907; 4,177,829; 4,483,367; 4,541,464; 5,072,751; 6,026,841.

SUMMARY OF THE INVENTION

This invention seeks to provide an improved filling apparatus for supplying a source of pressurized fluid to a container.

There is thus provided in accordance with a preferred embodiment of the present invention a filling valve for a pressurized fluid container. The filling valve includes a hollow valve body defining a longitudinal travel axis and internal valve body side walls and a sealing assembly located within the valve body and being arranged for displacement along the longitudinal travel axis from an open position to a closed position. The sealing assembly includes a generally cylindrical portion having generally cylindrical walls arranged in a non-sealing engagement with the internal valve body side walls and a flexible metal disc mounted on the cylindrical portion for sealing engagement with a surface of the internal valve body walls when the sealing assembly is in the closed position. The non-sealing engagement, between the cylindrical walls of the sealing assembly and the internal valve body side walls, allows particulate matter to flow therebetween, thereby reducing the jamming of the sealing assembly in the hollow valve body.

Further in accordance with a preferred embodiment of the present invention the hollow valve body also includes an end wall. The sealing assembly is configured for sealing engagement with the end wall when the sealing assembly is in the closed position. Preferably, the generally cylindrical portion of the sealing assembly is formed with a generally circular protrusion, which sealingly engages the end wall when the sealing assembly is in the closed position.

Still further in accordance with a preferred embodiment of the present invention the sealing assembly is hollow and permits fluid flow therethrough except when the sealing assembly is in the closed position.

Additionally in accordance with a preferred embodiment of the present invention the flexible metal disc is arranged generally in a plane perpendicular to the longitudinal travel axis.

Further in accordance with a preferred embodiment of the present invention the internal valve body side walls include a first internal valve body side wall portion having a first radius, a second internal valve body side wall portion having a second radius greater than the first radius and a shoulder defined between the first and second internal valve body side wall portions. The flexible metal disc sealingly engages the shoulder when the sealing assembly is in the closed position, but does not sealingly engage the first internal valve body side wall portion.

Additionally in accordance with a preferred embodiment of the present invention the internal valve body side walls include a first internal valve body side wall portion having a first radius, a second internal valve body side wall portion having a second radius greater than the first radius and being located closer to the end wall than the first internal valve body side wall portion and a shoulder defined between the first and second internal valve body side wall portions. The flexible metal disc sealingly engages the shoulder when the sealing assembly is in the closed position, but does not sealingly engage the first internal valve body side wall portion.

Still further in accordance with a preferred embodiment of the present invention the flexible metal disc sealingly engages the shoulder when the sealing assembly is in the closed position, while simultaneously the generally circular protrusion which sealingly engages the end wall when the sealing assembly is in the closed position.

Further in accordance with a preferred embodiment of the present invention the internal valve body side walls include a first internal valve body side wall portion having a first radius, a second internal valve body side wall portion having a second radius greater than the first radius and a shoulder defined between the first and second internal valve body side wall portions. The flexible metal disc sealingly engages the shoulder when the sealing assembly is in the closed position, but does not sealingly engage the first internal valve body side wall portion.

BRIEF DESCRIPTION OF THE DRAWINGS

The present invention will be understood and appreciated more fully from the following detailed description, taken in conjunction with the drawing in which.

DETAILED DESCRIPTION OF PREFERRED EMBODIMENTS

Figure 1:
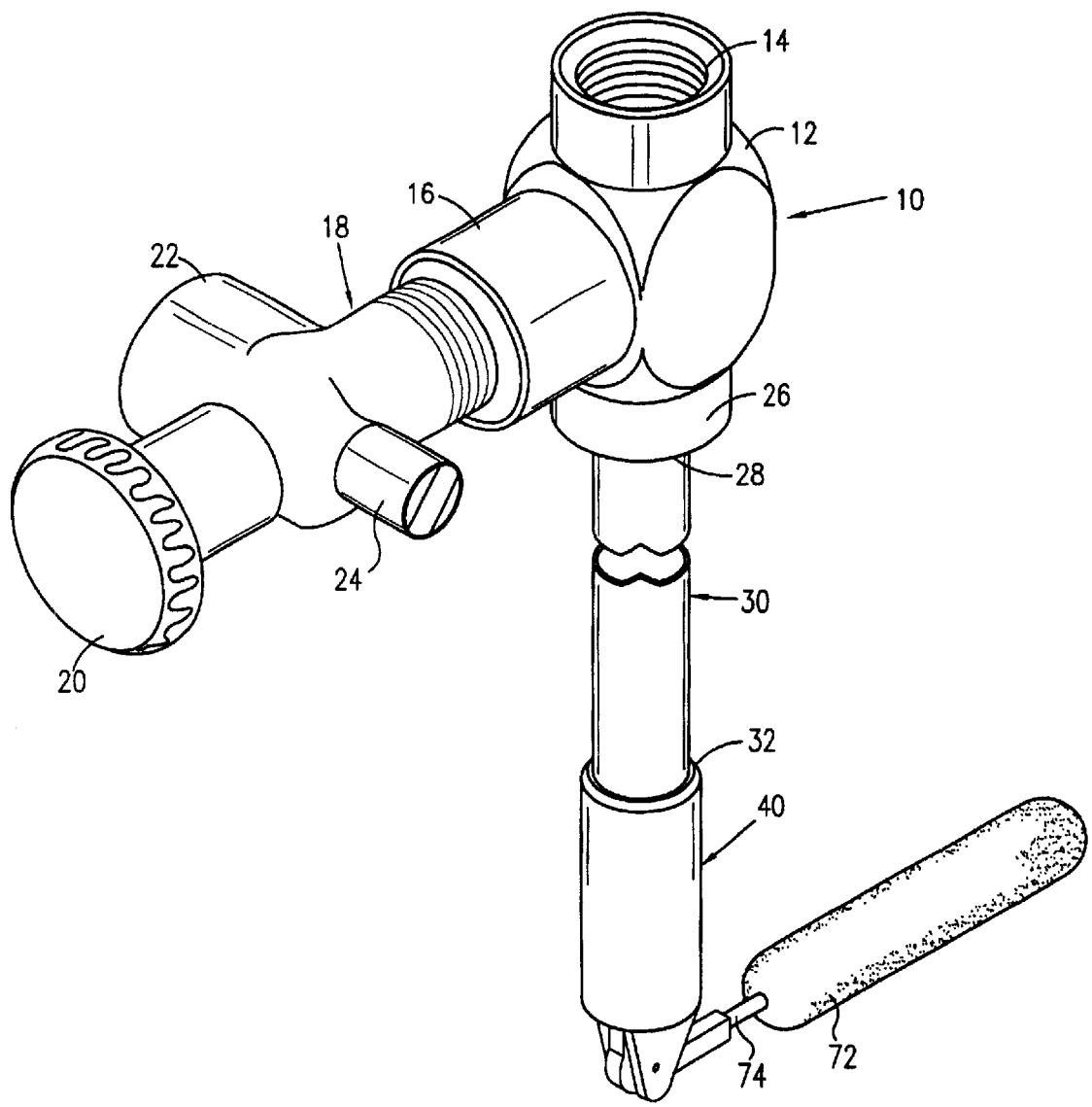
FIG. 1 is a simplified pictorial illustration of filling apparatus constructed and operative in accordance with a preferred embodiment of the present invention.

Reference is now made to FIG. 1, which illustrates filling apparatus 10, constructed and operative in accordance with a preferred embodiment of the present invention. Filling apparatus 10 preferably includes a tee 12, which includes a first threaded branch 14 for attachment thereat to a source of pressurized fluid (not shown), such as pressurized LPG. A second threaded branch 16 is preferably attached to a consumer valve 18. Valve 18 preferably includes a handle 20 for closing/opening thereof, a threaded coupling 22 for attachment thereat to a consumer fluid supply line (not shown), and a relief valve 24. A third threaded branch 26 of tee 12 is preferably attached to an upper end 28 of a pipe 30. A lower end 32 of pipe 30 is preferably attached to and in fluid communication with a valve 40.

Figure 2:
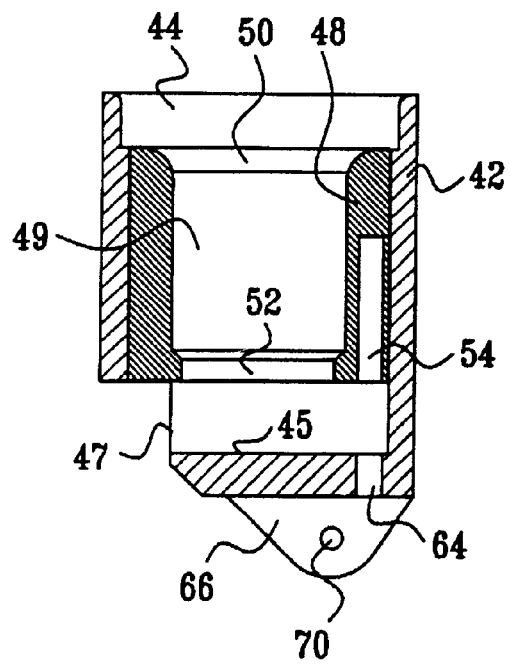
FIG. 2 is a simplified, partially sectional illustration of a valve of the filling apparatus of FIG. 1, constructed and operative in accordance with a preferred embodiment of the present invention, in an open position.
Figure 3:
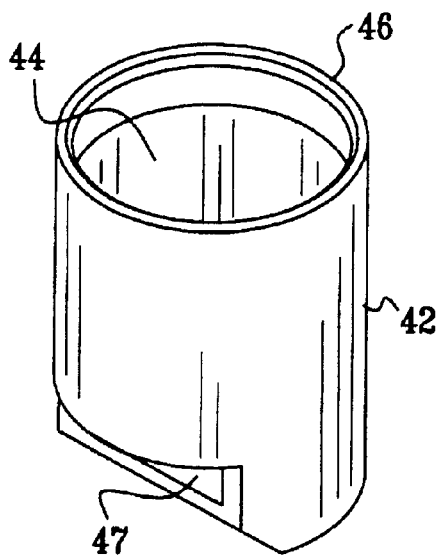
FIG. 3 is a simplified pictorial illustration of a valve body of the valve of FIG. 2.
Figure 4:
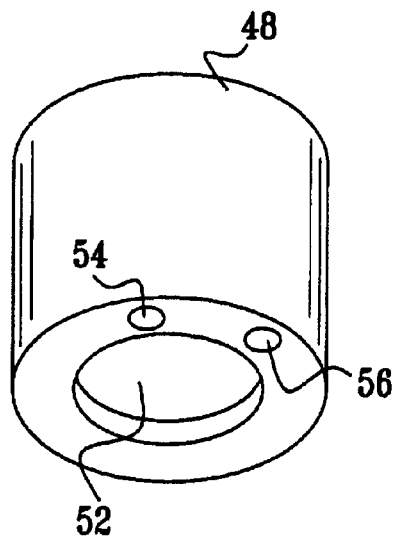
FIG. 4 is a simplified pictorial illustration of a sealing assembly of the valve of FIG. 2, the sealing assembly being slidingly disposed in the valve body in FIG. 2.

Reference is now made to FIGS. 2–4, which illustrate valve 40, constructed and operative in accordance with a preferred embodiment of the present invention, in an open position. Valve 40 includes a valve body 42 with a longitudinal bore 44 formed therein Bore 44 preferably has a threaded end 46 which is threadably connected to lower end 32 of pipe 30 (FIG. 1). A relatively large side opening 47 is formed in valve body 42, generally flush with a bottom inner surface 45 of valve body 42.

A sealing assembly 48, preferably generally cylindrical in shape, is slidingly disposed in valve body 42. Sealing assembly 48 is preferably formed with a bore 49 whose upper end 50 is larger in diameter than its lower end 52. Sealing assembly 48 is preferably formed with two blind holes 54 and 56.

Figure 5:
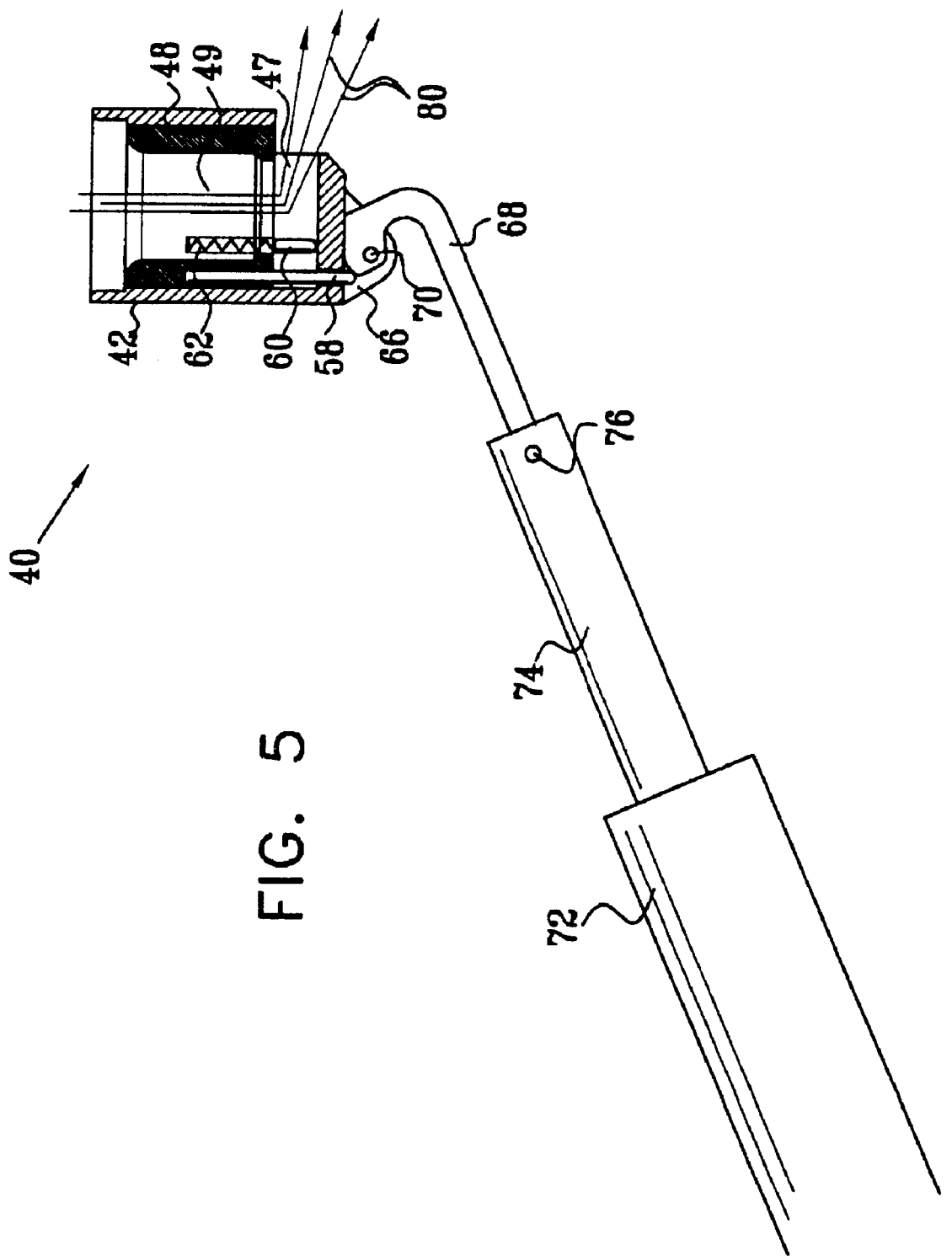
FIGS. 5 and 6 are simplified, partially sectional illustrations of the valve of FIG. 2, in respective open and closed orientations.

Reference is now additionally made to FIG. 5. Sealing assembly 48 includes a jutting portion, preferably in the form of an elongate pin 58 fixedly mounted in hole 54. A driver pin 60, shorter than pin 58, is slidingly disposed in hole 56 and is preferably biased by a biasing device, such as a spring 62. (For the sake of clarity, pins 58 and 60 are not shown in FIG. 2.) Valve body 42 is preferably formed with a hole 64 (FIG. 2) through which elongate pin 58 can slide.

Valve body 42 is preferably provided with an end wall portion 66. A valve lever 68 is preferably pivotally attached to end wall portion 66 by means of a pin 70. A float 72 is mounted on a float arm 74, which is pivotally attached to valve lever 68 by means of a pin 76. This pinned connection is discussed more in detail further hereinbelow.

In the position shown in FIG. 5, valve 40 is open. Float 72 is positioned at a generally obtuse angle with respect to pipe 30 (FIG. 1) and to a longitudinal axis of valve body 42. Elongate pin 58 is supported by the end of valve lever 68, and as such, sealing assembly 48 is raised and does not block side opening 47 of valve 40. A pressurized fluid 80 may be introduced from a fluid source (not shown) and flow through first threaded branch 14 and pipe 30 (FIG. 1), and through side opening 47 into a pressurized fluid container (not shown). As in U.S. Pat. No. 6,026,841, a bypass passageway (not shown) may be provided such that vapors of fluid 80 can be conducted through the bypass passageway even during filling of the container. In this way, a consumer can constantly use the fluid, such as for home cooking, without interruption, even during filling of container.

Figure 6:
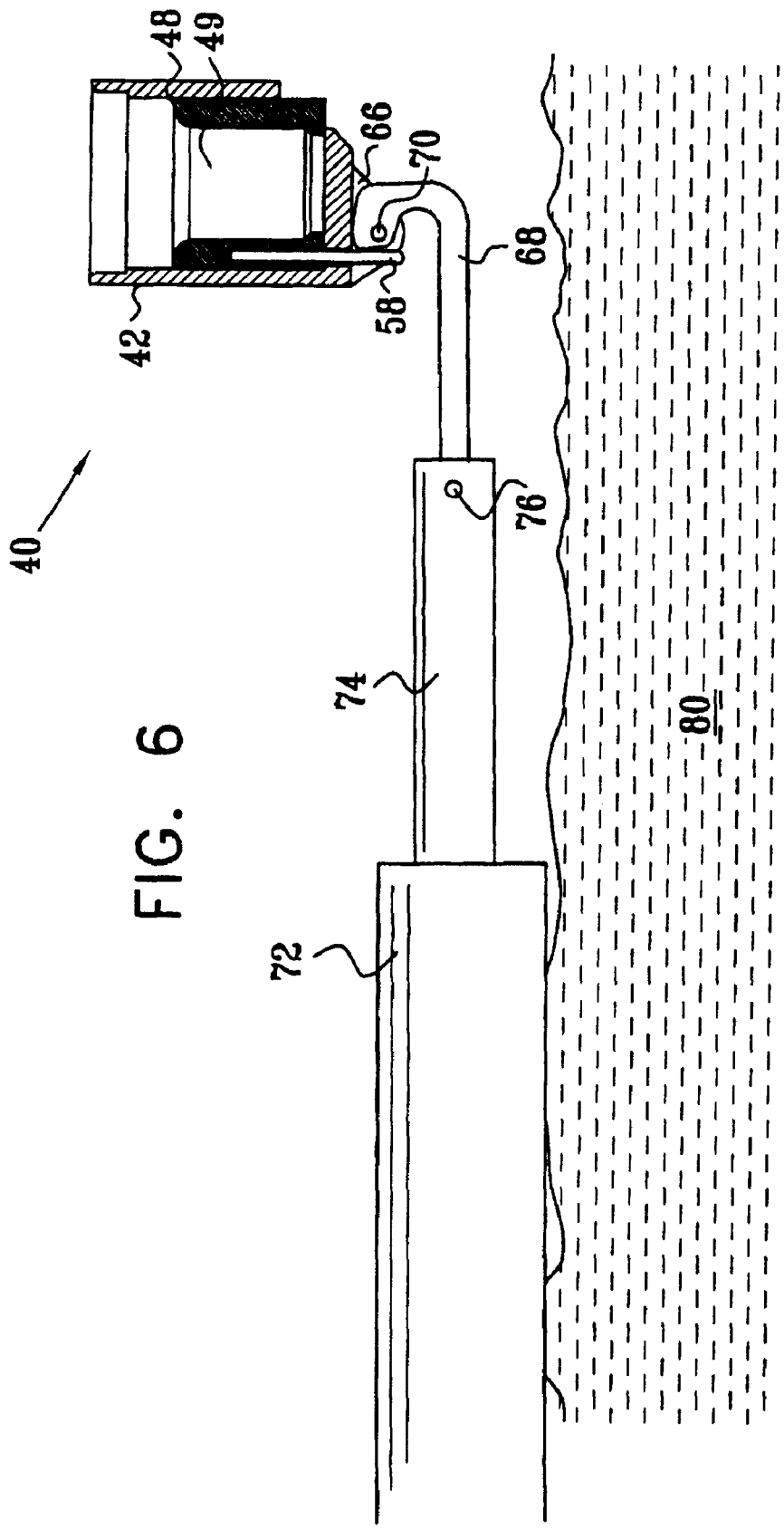

Reference is now made to FIG. 6, which illustrates the position of filling apparatus 10 upon further filling of the container with pressurized fluid 80, Upon sufficient filling of the container, float 72 is buoyed by fluid 80 which causes float arm 74 to swing upwards. Elongate pin 58 is no longer supported by the end of valve lever 68, and instead falls downwards along with sealing assembly 48. Sealing assembly 48 falls down to surface 45 of valve body 42 and now blocks side opening 47, thereby preventing pressurized fluid 80 from flowing through side opening 47 into the container. Thus filling apparatus 10 automatically stops filling the container without any need for fluid to escape to the environment to signal when to stop filling the container.

As mentioned hereinabove, the diameter of upper end 50 is larger than that of lower end 52 of bore 49 of sealing assembly 48. The difference in diameters means that the pressure of pressurized fluid 80 flowing through bore 49 is greater at the top of sealing assembly 48 than at the bottom. This ensures that sealing assembly 48 is maintained against surface 45 as long as fluid 80 is flowing through valve 40. After flow has stopped, pressure equilibrium is eventually reached between the top and bottom of sealing assembly 48. It is noted that the difference in diameters can be adjusted in the design of filling apparatus 10 to. achieve a desired pressure difference and thereby control the fluid flow.

Side opening 47 provides two surprising advantages. First, a significantly greater flow rate of pressurized fluid 80 passes through valve 40, meaning that the container is filled faster than before. Second, the flow through side opening 47 has significantly less turbulence than the bottom exit of U.S. Pat. No. 6,026,841. This is due, inter alia, to the fact that side opening 47 is located on the side of valve body 42 opposite to float 72 and float arm 74, and the flow does not impinge upon float 72 or float arm 74. Thus, in the present invention, a faster filling rate is achieved with significantly reduced turbulence.

As mentioned hereinabove,-after flow of fluid 80 has stopped, pressure equilibrium is eventually reached between the top and bottom of sealing assembly 48. The consumer draws upon fluid 80 from the container. Gradually the level of fluid 80 in the container goes down, and float arm 74 swings downwards. Spring 62 urges sealing assembly 48 upwards, thereby opening side opening 47 in order to permit further filling of the container, if desired.

Figure 7:
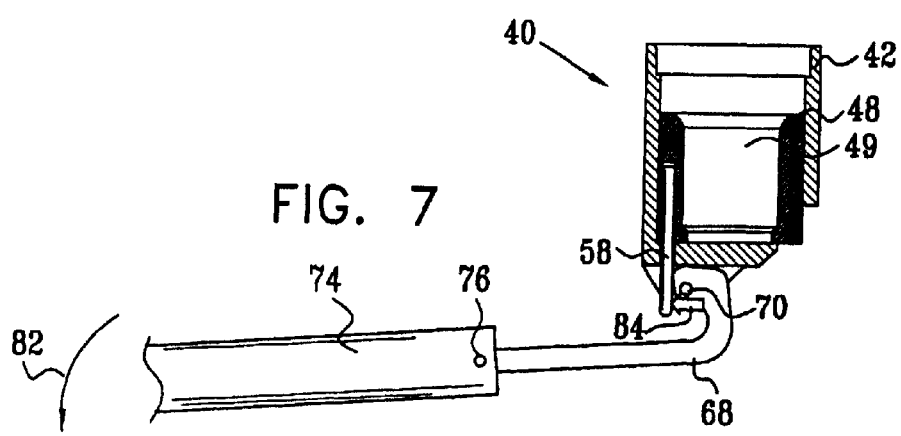
FIG. 7 is a simplified, partially sectional illustration of the valve of FIG. 2 with a float arm rigidly attached to a valve lever of the valve.

Reference is now made to FIG. 7. If float arm 74 were rigidly connected to valve lever 68, as float arm 74 swings down (about pin 70) in the direction of an arrow 82, valve lever 68 pushes against pin 58. The force of valve lever 68 against pin 58 works against the upward bias of spring 62, and may possibly interfere with the upward movement of sealing assembly 48.

However, as described hereinabove, float arm 74 is not rigidly connected to valve lever 68, but rather is pivotally connected to valve lever 68 about pin 76.

Figure 8:
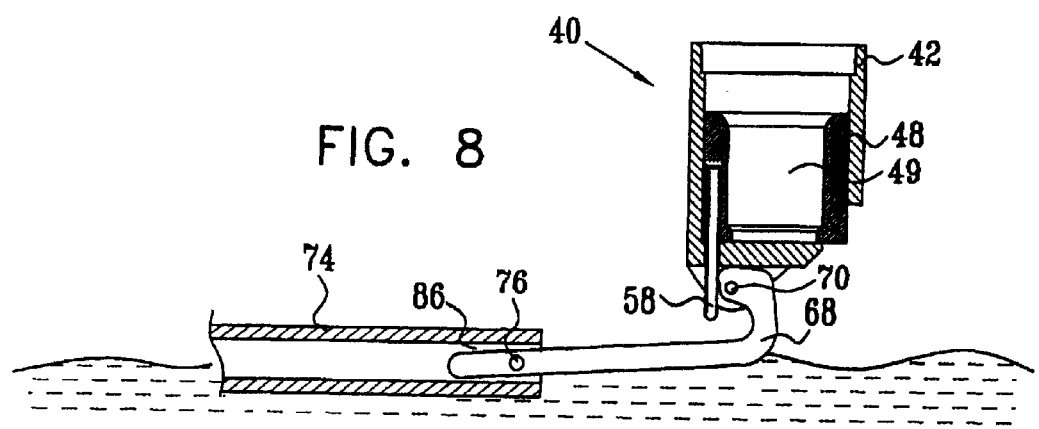
FIGS. 8 and 9 are simplified, partially sectional illustrations of the valve of FIG. 2 with the float arm pivotally attached to the valve lever, in accordance with a preferred embodiment of the present invention, respectively in closed and open positions.
Figure 9:
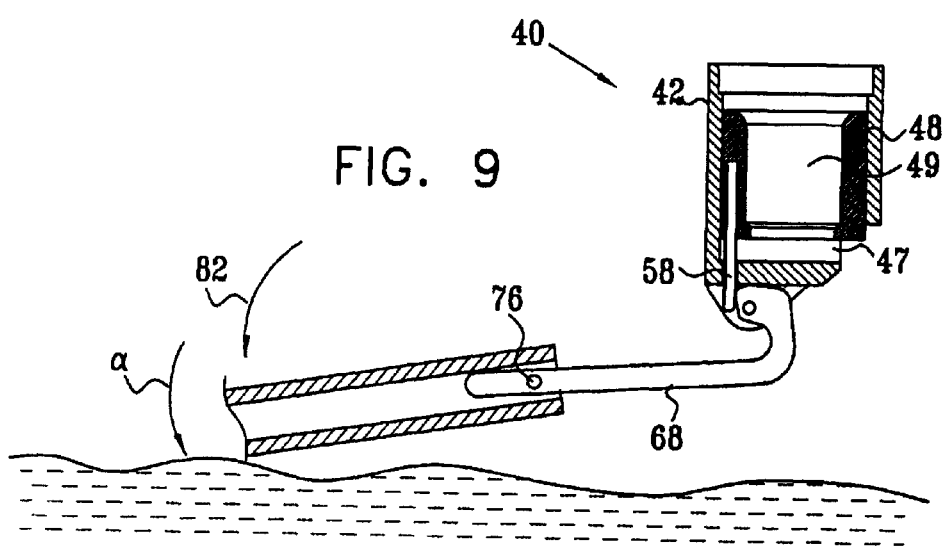

Referring to FIG. 8, it is further seen that there is a clearance 86 between an internal perimeter of float arm 74 and valve lever 68. As seen in FIG. 9, because of clearance 86, float arm 74 can rotate about pin 76 through an angle, a, in the direction of arrow 82, without causing any motion of valve lever 68. The clearance 86 moves from above valve lever 68 to below valve lever 68 from FIG. 8 to FIG. 9. This means that there is a delay in valve lever 68 moving, and valve lever 68 does not push against pin 58. During this delay, spring 62 urges sealing assembly 48 upwards in the absence of any sideways force of valve lever 68 against pin 58. Thus, spring 62 freely urges sealing assembly 48 upwards and thereby opens side opening 47.

Figure 10:
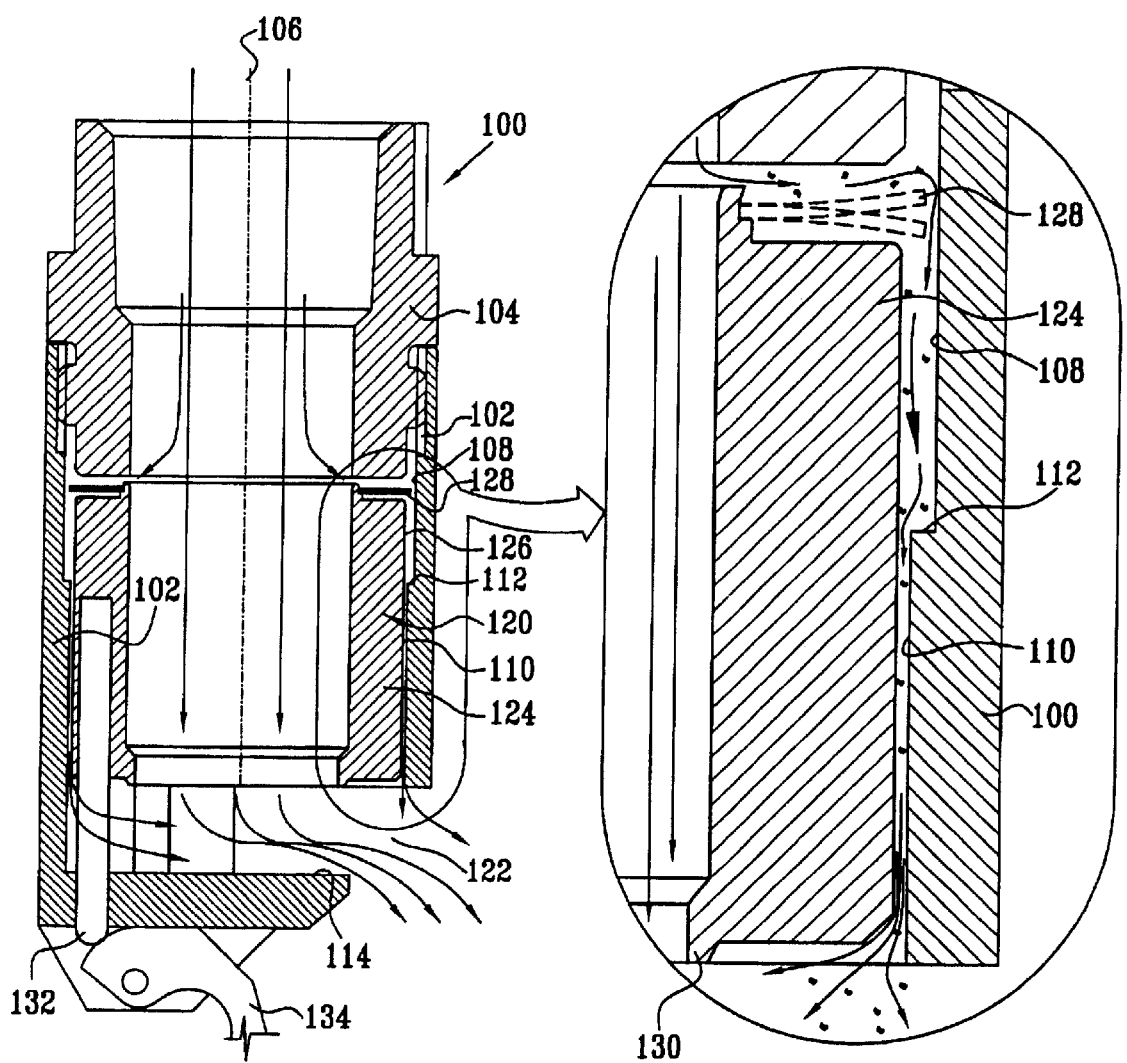
FIG. 10 is a simplified sectional illustration of a jamming-resistant filling valve for a pressurized fluid container constructed and operative in accordance with a preferred embodiment of the present invention in an open orientation.
Figure 11:
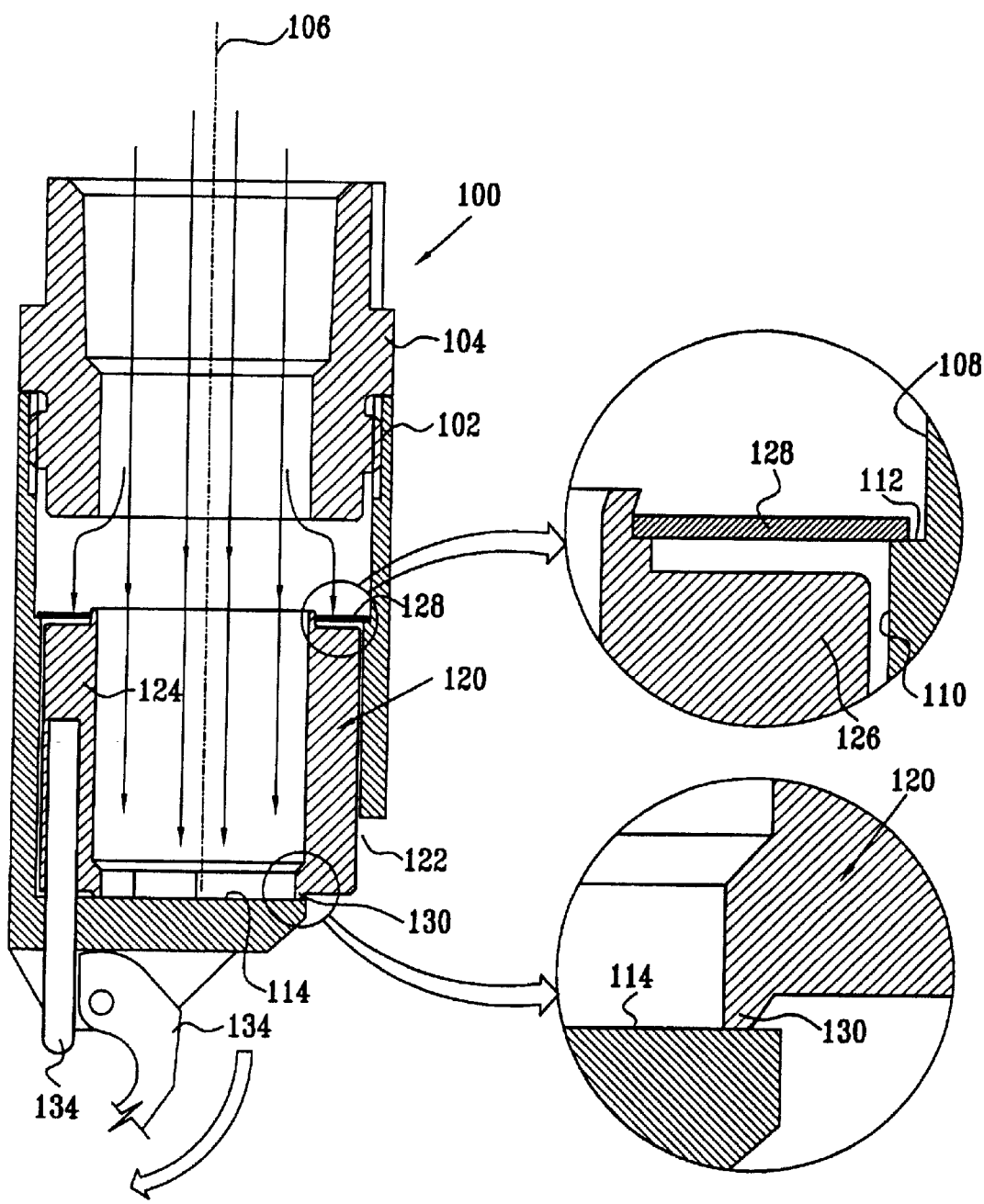
FIG. 11 is a simplified sectional illustration of the jamming-resistant filling valve for a pressurized fluid container of FIG. 10 in a closed orientation

Reference is now made to FIGS. 10 and 11 which illustrate a jamming-resistant filling valve for a pressurized fluid container constructed and operative in accordance with a preferred embodiment of the present invention in respective open and closed orientations.

As seen in FIGS. 10 and 11, the valve preferably comprises a valve body 100, which is preferably generally cylindrical and preferably defines an internally threaded attachment portion 102 to which a fitting 104 may be threadably connected for supply of fluid thereto.

Valve body 100 is generally hollow and defines a longitudinal travel axis 106. The interior of valve body 100 is bounded by generally cylindrical internal side walls, including a first internal wall portion 108 which typically lies adjacent the threaded attachment portion 102 and has a relatively large radius about axis 106. Adjacent first internal wall portion 108 is a second internal wall portion 110, which typically lies adjacent first internal wall portion 108 and is separated therefrom by a shoulder 112, typically lying in a plane perpendicular to axis 106.

Second internal wall portion 110 preferably has a radius about axis 106 which is somewhat smaller than that of first internal wall portion 108.

Valve body 100 also defines an end wall portion 114.

A hollow sealing assembly 120 is slidably disposed within valve body 100 for movement therein along longitudinal travel axis 106. The sealing assembly 120 normally lies in an open position, as seen in FIG. 10, wherein fluid received via fitting 104 and passing through the interior of valve body 100 and the interior of sealing assembly 120 can pass out of the valve via an opening 122 formed in valve body 100.

When permitted by the position of a float associated therewith the sealing assembly 120 may assume a closed position, as seen in FIG. 11, wherein the sealing assembly 120 is preferably sealed with respect to the valve body 100 at two separate locations, as will be described hereinbelow.

The sealing assembly 120 preferably comprises a generally cylindrical portion 124 having generally cylindrical walls 126 arranged in non-sealing engagement with the internal valve body side walls and a flexible metal disc 128, mounted on cylindrical portion 124 for sealing engagement with the shoulder 112, when the sealing assembly is in the closed position as seen in FIG. 11. Cylindrical portion 124 is preferably formed with a relatively narrow, generally circular protrusion 130 on an end surface thereof.

A pin 132 is preferably associated with cylindrical portion 124 for operative engagement with a cam 134, which may be associated with a float (not shown) in much the same way as described hereinabove with reference to FIGS. 1–9.

It is a particular feature of the present invention that non-sealing engagement is provided between the cylindrical walls of the sealing assembly 120 and the internal valve body side walls in order to allow particulate matter to flow therebetween, thereby reducing jamming of the sealing assembly in the hollow valve body. This particular structure allows foreign matter in the fluid to be regularly flushed out of the valve and not to collect between the movable parts thereof, which would otherwise result in jamming the parts, impeding their free movement.

It may thus be seen in FIG. 10 that when the sealing. assembly 120 is an the open position, flexible metal disc 128, which acts as a spring, does not engage the inner walls of the first internal wall portion 108. Thus, particulate matter, flowing in the fluid passing through the valve and entering the volume between the sealing assembly 120 and the valve body 100 can flow, generally unimpeded between the sealing assembly 120 and the valve body 100 and out of the valve, When the sealing assembly 120 assumes a closed position, as seen in FIG. 11, flexible metal disc 128 preferably exerts a spring force on shoulder 112, providing sealing therebetween This force is enhanced by the force exerted by fluid pressure on the sealing assembly when fluid received via fitting 104 is being pumped. It is appreciated that the flexibility of metal disc 128 enables sealing to be achieved notwithstanding variation in manufacturing tolerances of the valve body 100 and the sealing assembly 120.

When the sealing assembly 120 is in the closed position, generally circular protrusion 130 preferably formed on an end surface of cylindrical portion sealingly engages the end wall 114, providing sealing of the sealing assembly 120 with the valve body 100 at a second location. The sealing force exerted by protrusion 130 preferably is enhanced both by its relatively small surface area and by fluid pressure exerted by a pump.

It will be appreciated by persons skilled in the art that the present invention is not limited by what has been particularly shown and described hereinabove. Rather the scope of the present invention includes both combinations and subcombinations of the various features described hereinabove as well as variations and modifications which would occur to persons skilled in the art upon reading the specification and which are not in the prior art.

What is claimed is:

1. A filling valve for a pressurized fluid container, comprising:

a hollow valve body defining an upper valve body portion defining an inlet, a lower valve body portion defining an outlet and a longitudinal travel axis and internal valve body side walls; and a sealing assembly located within said valve body and being arranged for displacement along said longitudinal travel axis from an open position to a closed position, said sealing assembly comprising a generally hollow cylindrical portion including an upper portion and a lower portion and having generally cylindrical walls arranged in non-sealing engagement with said internal valve body side walls and a flexible metal disc mounted at said upper portion of said cylindrical portion for sealing engagement with a surface of said internal valve body side walls when said sealing assembly is in said closed position, the non-sealing engagement between said cylindrical walls of said sealing assembly and said internal valve body side walls allowing particulate matter to flow therebetween, thereby reducing jamming of said sealing assembly in said hollow valve body, said flexible metal disc being spaced from said inlet and engaging an intermediate wall portion of said internal valve body side walls of said hollow valve body when said lower portion of said cylindrical portion engages said lower valve body portion at said outlet, said lower portion of said sealing assembly being spaced from said lower valve body portion at said outlet when said sealing assembly is in said open position, said flexible metal disc being moved away from said intermediate wall portion of said internal valve body side walls of said hollow valve body when said sealing assembly is in said open position, thereby to allow particulate matter to flow between said sealing assembly and said internal valve body side walls, while permitting full fluid flow through said hollow cylindrical portion of said sealing assembly to said outlet, when said sealing assembly is in said open position, and said sealing engagement of said flexible metal disc preventing particulate matter from flowing between said sealing assembly and said internal valve body side walls.

2. A filling valve for a pressurized fluid container according to claim 1 and wherein:

said hollow valve body also comprises an end wall; and said sealing assembly is configured for sealing engagement with said end wall when said sealing assembly is in said closed position.

3. A filling valve for a pressurized fluid container according to claim 2 and wherein said flexible metal disc is arranged generally in a plane perpendicular to said longitudinal travel axis.

4. A filling valve for a pressurized fluid container according to claim 2 and wherein said internal valve body side walls comprise:

a first internal valve body side wall portion having a first radius;

a second internal valve body side wall portion having a second radius greater than said first radius and being located closer to said end wall than said first internal valve body side wall portion; and a shoulder defined between said first and second internal valve body side wall portions, and wherein said flexible metal disc sealingly engages said shoulder when said sealing assembly is in said closed position, but does not sealingly engage said first internal valve body side wall portion.

5. A filling valve for a pressurized fluid container according to claim 2 and wherein said generally cylindrical portion of said sealing assembly is formed with a generally circular protrusion which sealingly engages said end wall when said sealing assembly is in said closed position.

6. A filling valve for a pressurized fluid container according to claim 5 and wherein said flexible metal disc is arranged generally in a plane perpendicular to said longitudinal travel axis.

7. A filling valve for a pressurized fluid container according to claim 5 and wherein said internal valve body side walls comprise:

a first internal valve body side wall portion having a first radius;

a second internal valve body side wall portion having a second radius greater than said first radius; and a shoulder defined between said first and second internal valve body side wall portions, and wherein said flexible metal disc sealingly engages said shoulder when said sealing assembly is in said closed position, while simultaneously said generally circular protrusion sealingly engages said end wall when said sealing assembly is in said closed position.

8. A filling valve for a pressurized fluid container according to claim 1 and wherein said flexible metal disc is arranged generally in a plane perpendicular to said longitudinal travel axis.

9. A filling valve for a pressurized fluid container according to claim 1 and wherein said internal valve body side walls comprise:

a first internal valve body side wall portion having a first radius;

a second internal valve body side wall portion having a second radius greater than said first radius; and a shoulder defined between said first and second internal valve body side wall portions, and wherein said flexible metal disc sealingly engages said shoulder when said sealing assembly is in said closed position, but does not sealingly engage said first internal valve body side wall portion.

* * * * *